United States Patent
Shimokobe et al.

[11] Patent Number: 6,070,846
[45] Date of Patent: Jun. 6, 2000

[54] VIBRATION DAMPENING REARVIEW MIRROR SUPPORT STRUCTURE

[75] Inventors: Keikichi Shimokobe; Yoshiteru Kinoshita, both of Saitama, Japan

[73] Assignee: Honda Giken Kogyo Kabushiki Kaisha, Tokyo, Japan

[21] Appl. No.: 08/978,872

[22] Filed: Nov. 26, 1997

[30] Foreign Application Priority Data

Nov. 28, 1996 [JP] Japan ..................................... 8-317712

[51] Int. Cl.[7] ...................................................... A47F 7/14
[52] U.S. Cl. ......................... 248/475.1; 248/646; 248/562
[58] Field of Search ........................ 248/475.1, 476.477, 248/478, 479, 480, 483, 484, 549, 900, 562, 564, 565, 636; 296/78.1; 359/841, 872, 875, 881; 280/288.4, 284; 180/219

[56] References Cited

U.S. PATENT DOCUMENTS

| | | | |
|---|---|---|---|
| 3,887,156 | 6/1975 | Hugonnier | 248/475.1 |
| 4,728,181 | 3/1988 | Kakinuma | 350/632 |
| 4,776,624 | 10/1988 | Sakuma | 296/1.1 |
| 4,936,537 | 6/1990 | Namba et al. | 248/475.1 |
| 5,639,054 | 6/1997 | Gerndt et al. | 248/478 |
| 5,818,650 | 10/1998 | Nyhof et al. | 359/876 |
| 5,889,624 | 3/1999 | Dickenson | 359/841 |

FOREIGN PATENT DOCUMENTS

| | | |
|---|---|---|
| 4112214 | 10/1992 | Germany . |
| 4200744 | 7/1993 | Germany . |
| 59-106740 U | 7/1984 | Japan . |
| 61-203180 U | 12/1986 | Japan . |

*Primary Examiner*—Leslie A. Braun
*Assistant Examiner*—Gwendolyn Baxter
*Attorney, Agent, or Firm*—Birch, Stewart, Kolasch & Birch, LLP

[57] ABSTRACT

A support structure for a motorcycle's rearview mirror includes a vibration dampening device. The support structure includes a mirror base attached to a fairing stay of the motorcycle. The vibration dampening device includes an isolated weight supported between two elastic members. The elastic members are attached to the fairing stay close to the attachment location of the mirror base to the fairing stay. Since the isolated weight is attached to the fairing stay, it can be large enough to sufficiently dampen vibrations which propagate along the fairing stay, without adversely affecting the outward appearance of the motorcycle.

16 Claims, 5 Drawing Sheets

VIBRATION DAMPENING REARVIEW MIRROR SUPPORT STRUCTURE

BACKGROUND OF THE INVENTION

1. Field of the Invention

The present invention relates to a motorcycle's rearview mirror support structure. More particularly, the present invention relates to a vibration dampening device of the support structure for dampening vibrations of the rearview mirror.

2. Description of Background Art

Support structures for a motorcycle's rearview mirror which include a vibration dampening device are known. For example, Laid-open Japanese Patent No. Sho 59-106740, titled "Vibration Isolating Mirror," and Laid-open Japanese Patent No. Sho 61-203180, titled "Structure Attaching a Rearview Mirror to a Motor-Cycle" describe rearview mirror support structures which include a vibration dampening device. For purposes of an introduction to the background art, the two Japanese Patents will be briefly described.

Japanese Patent No. Sho 59-106740 shows a rearview mirror 14 and a supporting structure. The rearview mirror includes a vibration dampening device in the form of an isolated weight 28 attached through a couple of elastic members 26 and 27 to a mirror backing 24. The isolated weight 28 is contained inside a mirror housing 21.

The dampening efficiency of the vibration dampening device is directly related to the size of the isolated weight 28. Therefore, if vibrations are to be adequately dampened, the size of the mirror housing 21 must be made large enough to accommodate a relatively large isolated eight 28. Often, it is desirable to make the mirror housing 21 small in order to maintain a sleek appearance of the motorcycle, and to improve the aerodynamics of the motorcycle. However, a small mirror housing 21 has insufficient space to house an adequately sized isolated weight 28. Thus, the isolated weight 28 must also be reduced in size, and the vibration dampening performance correspondingly suffers.

Japanese Patent No. Sho 61-203180 shows a rearview mirror 5. The rearview mirror 5 is connected to a mirror stay 8. A bolt 16 connects the mirror stay 8 to a fairing stay 9. The bolt 16 is connected to the mirror stay 8 through a vibration dampening device 12.

The vibration dampening device 12 includes an inner collar 13, an outer collar 14 and a rubber member 15 sandwiched between the inner collar 13 and the outer collar 14. The vibration dampening device 12 is designed to reduce the amount of vibration in the rearview mirror 5 by reducing vibrations in the mirror stay 8.

In a structure for supporting a rearview mirror of a motorcycle wherein the rearview mirror is attached to the fairing stay, two types of vibrations must be accommodated. The rearview mirror itself will tend to vibrate due to its own resonance, and vibration will tend to propagate from the fairing stay to the rearview mirror. The vibrations in the fairing stay may be due to engine vibrations and suspension vibrations as the motorcycle is operated.

Japanese Patent No. Sho 61-203180 discloses that in order to suppress the respective forms of vibration, that the volume of the vibration dampening device 12 should be increased, and that the stiffness of the fairing stay 9 should be increased.

As drawbacks to these disclosed solutions, if the volume of the vibration dampening device 12 is increased, the base of the mirror stay 8 must be increased. Again, it is often desirable to maintain a thin mirror stay for the purposes of sleek appearance and aerodynamics. Further, if the stiffness of the fairing stay 9 is increased, the total weight of the motorcycle correspondingly increases, giving rise to decreased performance of the motorcycle.

SUMMARY AND OBJECTS OF THE INVENTION

It is a primary object of the present invention to provide a structure for supporting a rearview mirror of a motorcycle, which is capable of dampening vibration of the rearview mirror.

It is a further object of the present invention to provide a vibration dampening device for a rearview mirror which does not increase the size of the rearview mirror housing or mirror stay, and which does not require increasing the stiffness of the fairing stay.

It is yet a further object of the present invention to provide a rearview mirror supporting structure with a vibration dampening device which allows for maintaining a sleek appearance of the motorcycle, and allows for improved aerodynamics of the motorcycle.

These and other objects of the present invention are fulfilled by providing an apparatus for supporting a rearview mirror of a vehicle comprising: a first extension for supporting a mirror; a base connected to said first extension; a second extension for connection to a vehicle, said second extension being connected to said base; and a vibration dampening device attached to said second extension.

These and other objects of the present invention are also fulfilled by providing an apparatus for supporting a rearview mirror of a vehicle comprising: a fairing; a fairing stay supporting said fairing; a base connected to said fairing stay; a mirror stay connected to said base; a rearview mirror connected to said mirror stay; and a dampener connected to said fairing stay adjacent the connection between said fairing stay and said base.

These and other objects of the present invention are also fulfilled by providing an apparatus for supporting a rearview mirror of a vehicle comprising: a first extension; a base connected to said first extension; a second extension, said second extension being connected to said base; a weight having a first end and a second end; a first resilient mount connected to said first end of said weight, and connected to said second extension; and a second resilient mount connected to said second end of said weight, and connected to said second extension.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
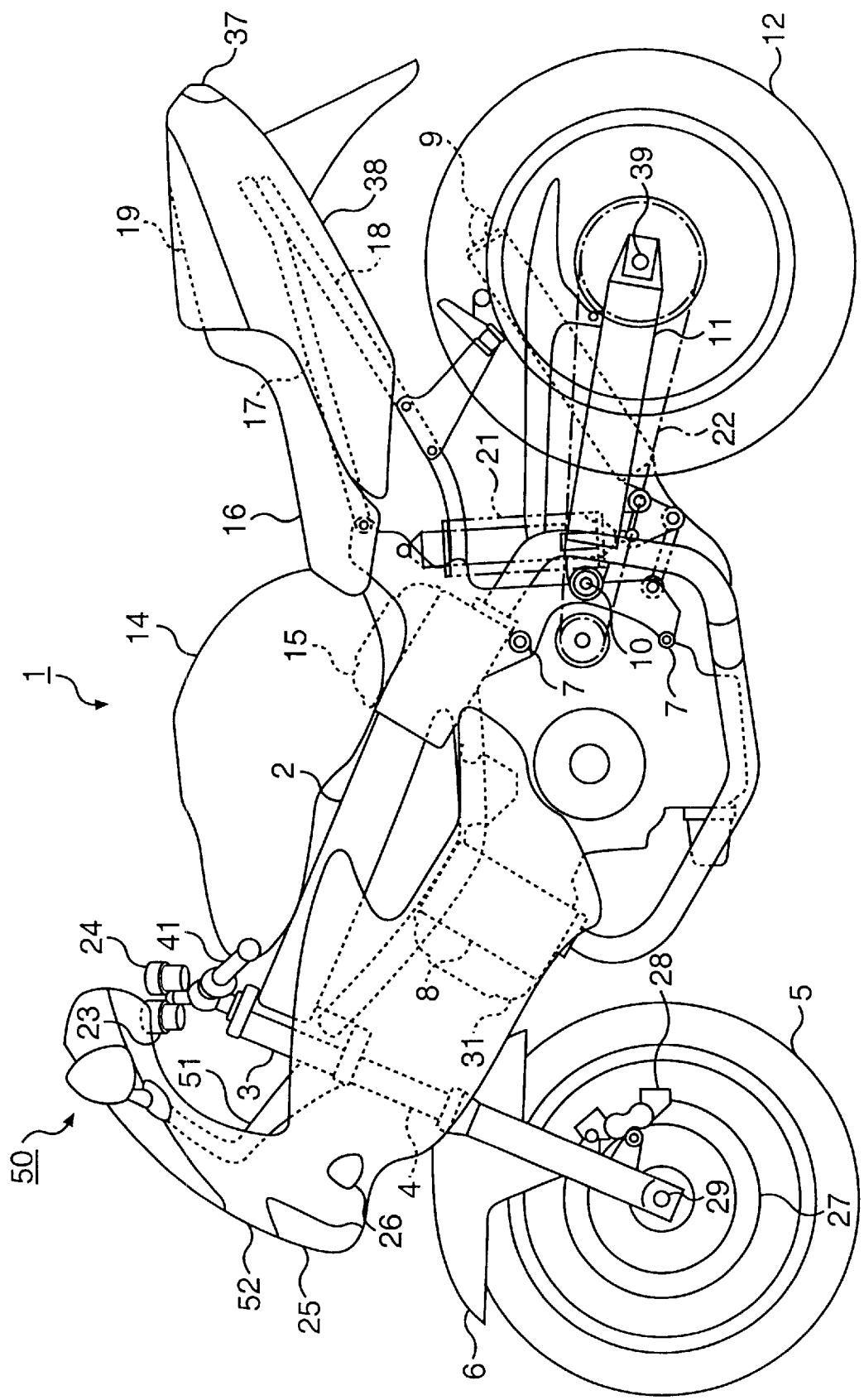
FIG. 1 is a side view of a motorcycle having a rearview mirror supporting structure according to the present invention.

FIG. 1 illustrates a motorcycle 1 having a main frame 2. The main frame 2 includes a head pipe 3 which supports a front fork 4. A front axle 29 and a front fender 6 are provided on the front fork 4. The front axle 29 supports a front wheel 5. A brake disc 27 and a caliper 28 are provided for braking the front wheel 5.

The upper portion of the front fork 4 is surrounded by a fairing 52. A head light 25 is located in a front central region of the fairing 52, and air ducts 26 are located in side regions of the fairing 52. The upper portion of the front fork 4 supports a steering handle 41. A brake oil cup 23 and a clutch oil cup 24 are attached to the steering handle 41. A rearview mirror and a supporting structure for the rearview mirror are generally indicated by reference numeral 50. The rearview mirror and its supporting structure 50 will be explained in greater detail with reference to FIGS. 2–5, below.

The motorcycle 1 also includes a fuel tank 14, a driver's seat 16, a passenger's seat 19, and seat rails 17 and 18 for supporting the driver's seat and passenger's seat. A seat cowling 38 surrounds the seat rails 17 and 18. A tail light 37 is located in a rear, central region of the seat cowling 38.

A V-type engine 8 is installed beneath the main frame 2 using a pair of engine hangers 7. A rear head cover 15 is installed over a rear head of the V-type engine 8, and a front head cover 31 is installed over a front head of the V-type engine 8. An exhaust pipe 9 extends from the V-type engine 8.

Near a rear of the V-type engine 8, a swing arm 11 is pivotally supported on a shaft 10. A rear suspension 21 connects the swing arm 11 to a portion of the main frame 2. A rear axle 39 is installed on the swing arm 11. The rear axle 39 supports a rear wheel 12. A drive chain 22 transmits power from the V-type engine 8 to the rear wheel 12.

Figure 2:
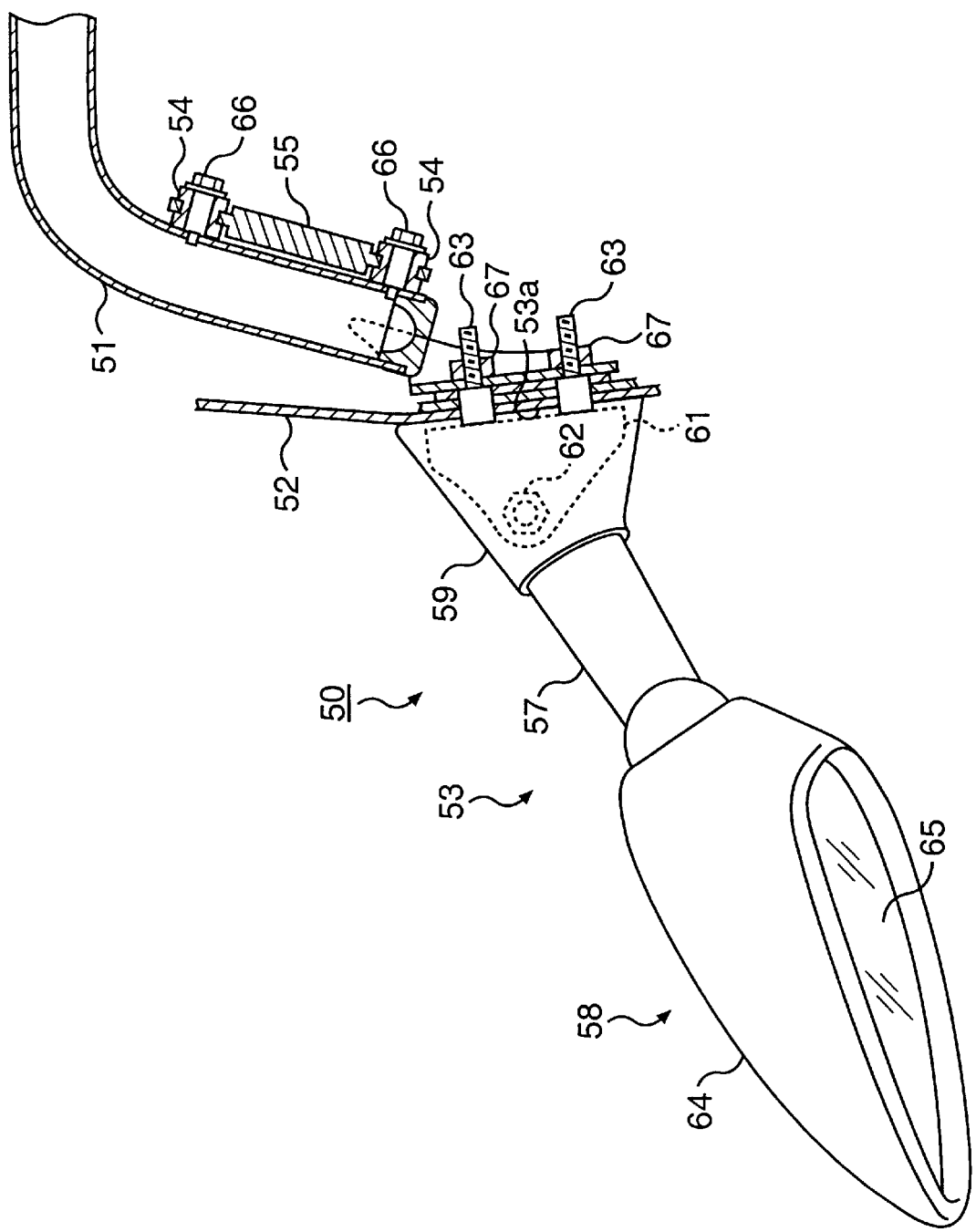
FIG. 2 is an overhead view in partial cross section illustrating the rearview mirror supporting structure with a vibration dampening device according to a first embodiment of the present invention.

FIG. 2 illustrates the rearview mirror and its supporting structure 50 in conjunction with a vibration dampening device, according to a first embodiment of the present invention.

A rear view mirror 53 includes a rearview mirror main body 58. The rearview mirror main body 58 includes a housing 64 and a mirror 65. A mirror stay 57 is formed as a tubular extension for locating the rearview mirror main body 58 a predetermined distance away from the fairing 52. One end of the mirror stay 57 is connected to the rearview mirror main body 58 by a swivel joint. The swivel joint provides a high degree of stable flexibility between the mirror stay 57 and the rearview mirror main body 8. The other end of the mirror stay 57 is connected to a base main body 61 by a bolt 62.

A fairing stay 51 is disposed inside the fairing 52. The fairing stay 51 serves to support the fairing 52 and the base main body 61. A boot 59 covers the base main body 61 in order to improve the appearance of an interface 53a between the base main body 61 and the fairing 52.

The base main body 61 includes a pair of bolts 63. The pair of bolts 63 may be integrally formed with the base main body 61, welded thereto, threaded therein, or attached by any other suitable means for permanent or semi-permanent attachment. The pair of bolts 63 are passed through holes provided in the fairing 52 and holes provided in an extension portion of the fairing stay 51. A pair of fastening nuts 67 are threadably engaged with the pair of bolts 63 in order to secure the base main body 61 to the fairing stay 51.

Now, the vibration dampening device according the first embodiment will be described. The fairing stay 51 has attached thereto, a pair of elastic members 54 and a vibration isolated weight 55 supported between the elastic members 54. The pair of elastic members 54 are attached to the fairing stay 51 by fastening devices 66. Fastening devices 66 may be bolts, screws, rivets, or any other type of fastening device.

Figure 3A:
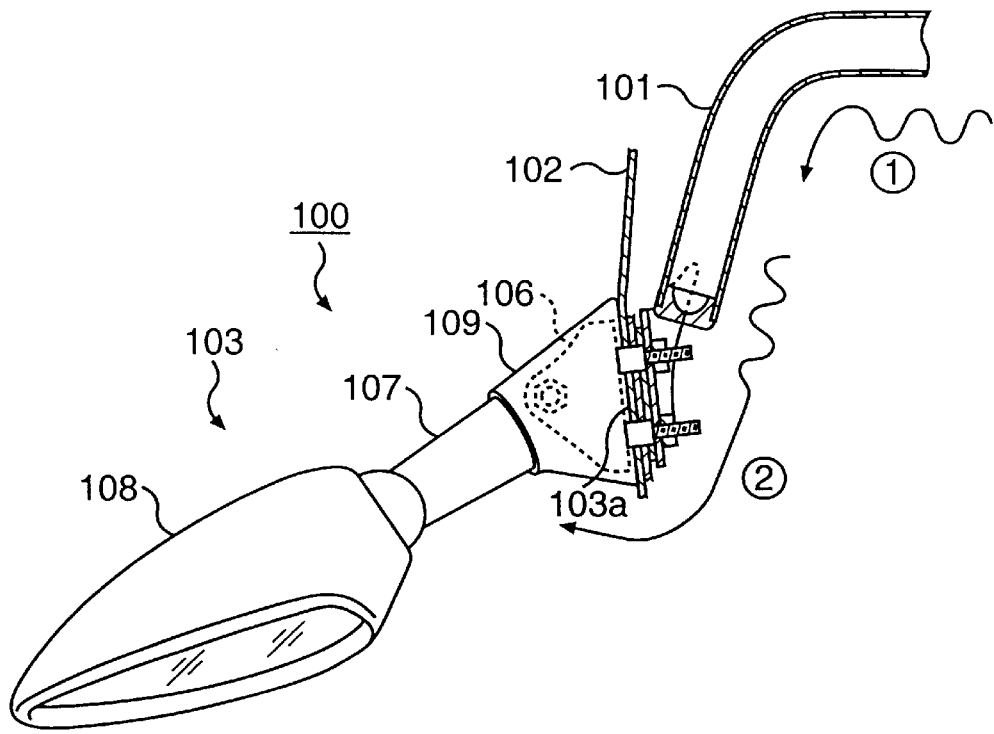
FIG. 3(a) is an overhead view in partial cross section illustrating vibration propagation in a rearview mirror supporting structure in accordance with the background art.

The benefits of the vibration dampening device will become more apparent by a comparison with a rearview mirror supporting structure which fails to include a vibration dampening device. To this end, reference is made to FIG. 3(a). FIG. 3(a) illustrates a rearview mirror and its supporting structure 100 according to the background art. Specifically, the conventional rearview mirror and its supporting structure 100 includes a fairing stay 101, a fairing 102 and a rearview mirror 103.

The rearview mirror 103 includes a mirror base 106, a mirror stay 107 attached to the mirror base 106, and a rearview mirror main body 108 attached to the mirror stay 107. A boot 109 covers an interface 103a between the mirror base 106 and the fairing 102.

As shown in FIG. 3(a), vibration is propagated from the fairing stay 101 in a direction indicated by an arrow (1). When the vibration reaches the mirror base 106, it continues to propagate in a direction shown by an arrow (2) without attenuation. As a result, the mirror base 106 and mirror stay 107 vibrate, which ultimately causes the mirror 65 to vibrate.

From a safety standpoint vibrations in the mirror 65 are dangerous, since it is difficult to see, make judgements about, or even recognize objects in a vibrating mirror. Therefore, reduction of mirror vibrations is quite desirable.

Even if an isolated weight, in accordance with Japanese Patent No. Sho 59-106740, is included inside the rearview mirror main body 108, the rearview mirror will still vibrate. Since vibrations from the fairing stay 101 propagate into the mirror stay 107, as indicated by the arrow (2), the mirror base 106 will vibrate. An isolated weight inside the rearview mirror main body 108 will simply be insufficient to dampen both the natural resonating type vibration of the rearview mirror and the vibrations induced from the fairing stay.

Figure 3B:
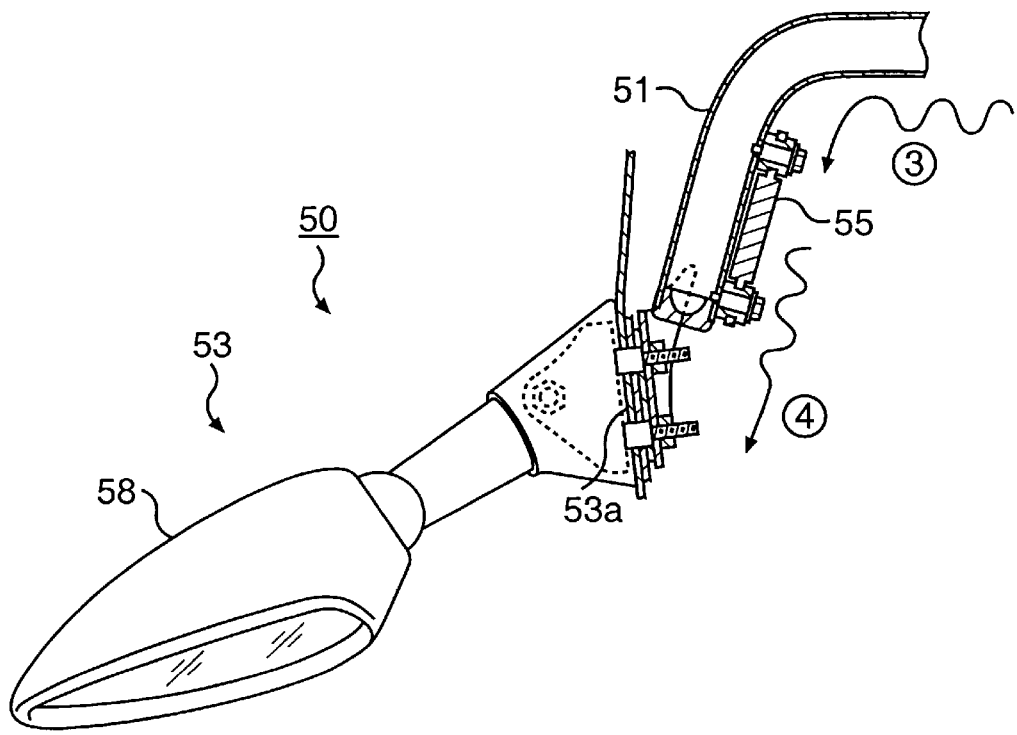
FIG. 3(b) is an overhead view in partial cross section illustrating vibration dampening in the rearview mirror supporting structure in accordance with the present invention.

FIG. 3(b) illustrates the rearview mirror and its supporting structure 50 according to the first embodiment of the present invention. As shown, when vibrations are propagated along the fairing stay 51, in a direction shown by arrow (3), the vibrations are attenuated, as illustrated by arrow (4), by the vibration isolated weight 55 attached to the fairing stay 51.

The isolated weight 55 is mounted in close proximity to the interface 53a between the base main body 61 and the fairing 52. Accordingly, vibrations do not propagate to the rearview mirror main body 58.

Figure 4:
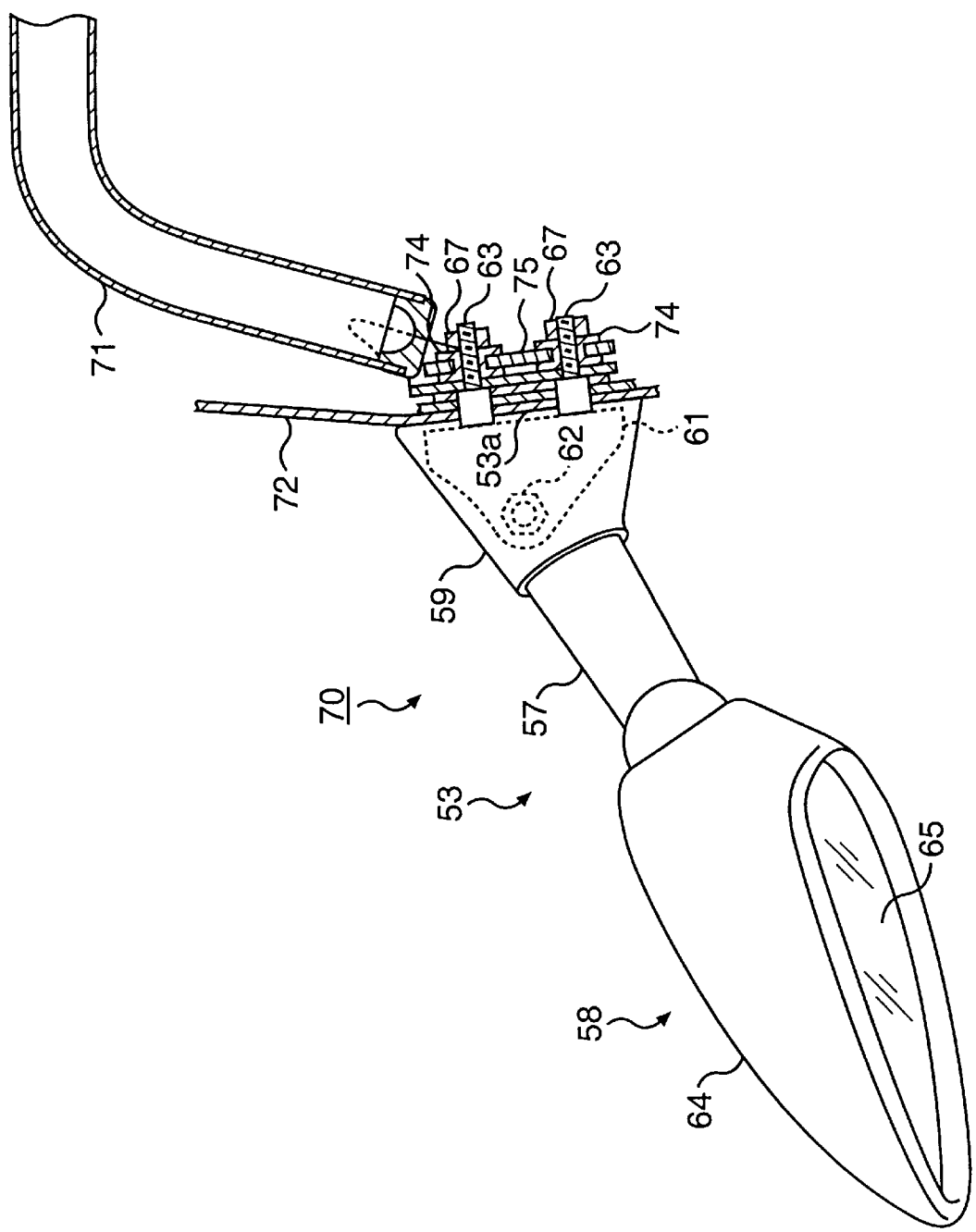
FIG. 4 is an overhead view in partial cross section illustrating the rearview mirror supporting structure with a vibration dampening device according to a second embodiment of the present invention.

FIG. 4 is an overhead view in partial cross section illustrating the rearview mirror supporting structure with a vibration dampening device according to a second embodiment of the present invention. As shown, the rearview mirror and its supporting structure 70 includes a fairing stay 71, a fairing 72, and the rearview mirror 53.

The rear view mirror 53 is constructed the same as described above in conjunction with the first embodiment, illustrated in FIG. 2. Also similar to the first embodiment, the base main body 61 includes a pair of bolts 63. The pair of bolts 63 may be integrally formed with the base main body 61, welded thereto, threaded therein, or attached by any other suitable means for permanent or semi-permanent attachment. The pair of bolts 63 are passed through holes provided in the fairing 72 and holes provided in an extension portion of the fairing stay 71. A pair of fastening nuts 67 are threadably engaged with the pair of bolts 63 in order to secure the base main body 61 to the fairing stay 71.

The vibration dampening device is installed on the pair of bolts 63. Elastic members 74 are provided in the form of a pair of resilient bushings. The pair of resilient bushings respectively surround the pair of bolts 63. An isolated weight 75 is suspended between the elastic members 74, and the nuts 67 are threadably engaged to the bolts 63 to secure the entire arrangement.

According to the second embodiment, isolated weight 75 is attached to the fairing stay 71 using the same bolts 63 which secure the base main body 61 to the fairing stay 71. Therefore, the number of parts, cost of parts, and weight of the assembly are reduced. Since the isolated weight 75 is still located adjacent the end of the fairing stay 71, vibrations propagated from the fairing stay 71 may be effectively suppressed.

Figure 5:
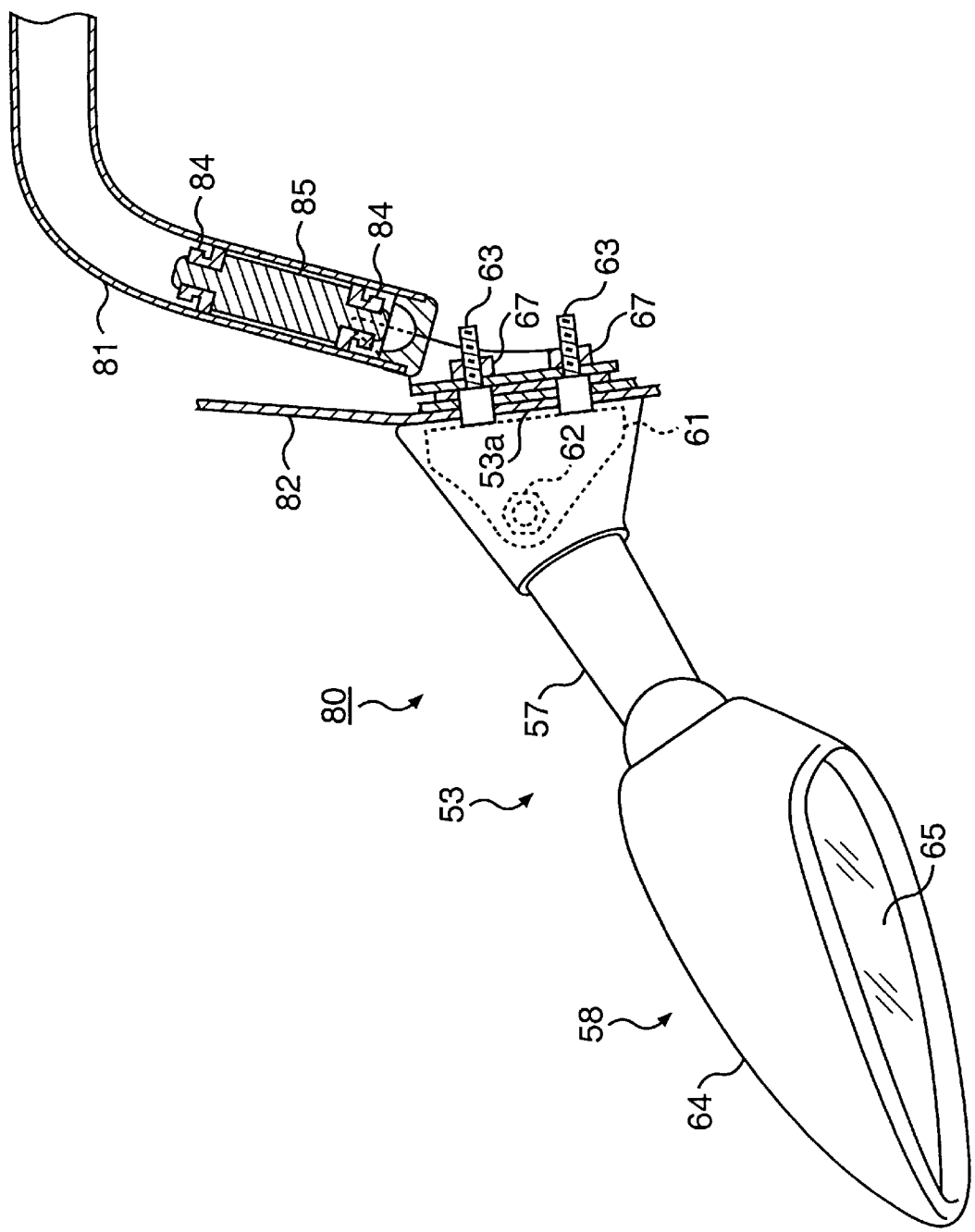
FIG. 5 is an overhead view in partial cross section illustrating the rearview mirror supporting structure with a vibration dampening device according to a third embodiment of the present invention.

FIG. 5 is an overhead view in partial cross section illustrating the rearview mirror supporting structure with a vibration dampening device according to a third embodiment of the present invention. As shown, the rearview mirror and its supporting structure 80 includes a fairing stay 81, a fairing 82, and the rearview mirror 53.

The rear view mirror 53 is constructed the same as described above in conjunction with the first embodiment, illustrated in FIG. 2. Further, the connection between the base main body 61 and the fairing stay 81 is the same as described above in conjunction with the first embodiment, illustrated in FIG. 2.

In the third embodiment, the vibration dampening device is installed inside the fairing stay 81. As shown, two elastic members 84 support the isolated weight 85 therebetween. Again, the isolated weight 85 is provided close to the end of the fairing stay 81 so that vibrations propagated from the fairing stay 81 may be effectively suppressed. Since, the isolated weight 85 is accommodated inside the fairing stay 81, a good external appearance of the fairing stay 81 can be maintained, without sacrificing the original external appearance thereof.

By attaching the isolated weight to the fairing stay in one of the positions according to the embodiments of the present invention, the size of the isolated weight may be increased. As stated earlier, the dampening characteristics of the isolated weight are directly related to the size of the weight. Since the isolated weight is attached to the fairing stay, the mirror housing can be reduced in size, thus maintaining a sleek appearance and aerodynamic characteristic of the motorcycle.

Although, the above description has referred to a motorcycle, the present invention is applicable to any vehicle, including a bicycle, scooter, forklift, automobile, etc. Further, it is possible to use a small isolated weight inside the mirror housing, as disclosed in the background art, in combination with a larger isolated weight attached to the fairing stay, in accordance with the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for supporting a rearview mirror of a vehicle comprising:
   a first extension;
   a base connected to said first extension;
   a second extension, said second extension being connected to said base; and
   a vibration dampening device attached to said second extension, wherein said second extension is in the form of a tubular member, and said vibration dampening device is attached inside said tubular member, wherein said vibration dampening device includes a weight suspended between two resilient members.

2. The apparatus according to claim 1, wherein said first extension is mirror stay, and said second extension is a fairing stay for supporting a fairing.

3. The apparatus according to claim 1, wherein said vibration dampening device is attached inside said tubular member adjacent a connection location of said tubular member and said base.

4. The apparatus according to claim 1, wherein said two resilient members are two elastic bushings.

5. An apparatus for supporting a rearview mirror of a vehicle comprising:
   a first extension;
   a base connected to said first extension;
   a second extension, said second extension being connected to said base;
   a weight having a first end and a second end;
   a first resilient mount connected to said first end of said weight, and connected to said second extension; and
   a second resilient mount connected to said second end of said weight, and connected to said second extension.

6. The apparatus according to claim 5, wherein said weight is isolated from said second extension.

7. The apparatus according to claim 6, wherein said second extension is tubular, and said weight is at least partially located inside said tubular second extension.

8. An apparatus for supporting a rearview mirror of a vehicle comprising:
   a first extension for supporting the mirror;
   a base connected to said first extension;
   a second extension for connection to the vehicle, said second extension being connected to said base; and a vibration dampening device attached to said second extension, wherein said vibration dampening device includes a weight suspended by at least one resilient member.

9. The apparatus according to claim 8, wherein said first extension is a mirror stay, and said second extension is a fairing stay for supporting a fairing.

10. The apparatus according to claim 9, further comprising:

a fastener, said fastener connecting said fairing stay to said base, said fastener also connecting said vibration dampening device to said fairing stay.

11. The apparatus according to claim 9, wherein said vibration dampening device is attached to an exterior surface of said fairing stay.

12. The apparatus according to claim 11, wherein said vibration dampening device is attached to said exterior surface of said fairing stay adjacent a connection location of said fairing stay and said base.

13. The apparatus according to claim 8, wherein said at least one resilient member includes two resilient members and said weight is suspended between said two resilient members.

14. The apparatus according to claim 13, wherein said two resilient members are two elastic bushings.

15. The apparatus according to claim 14, further comprising:

two connectors, said two connectors passing through said two elastic bushings and attaching said weight to said second extension.

16. The apparatus according to claim 15, wherein said two connectors also serve to connect said second extension to said base.

* * * * *